United States Patent Office 2,927,950
Patented Mar. 8, 1960

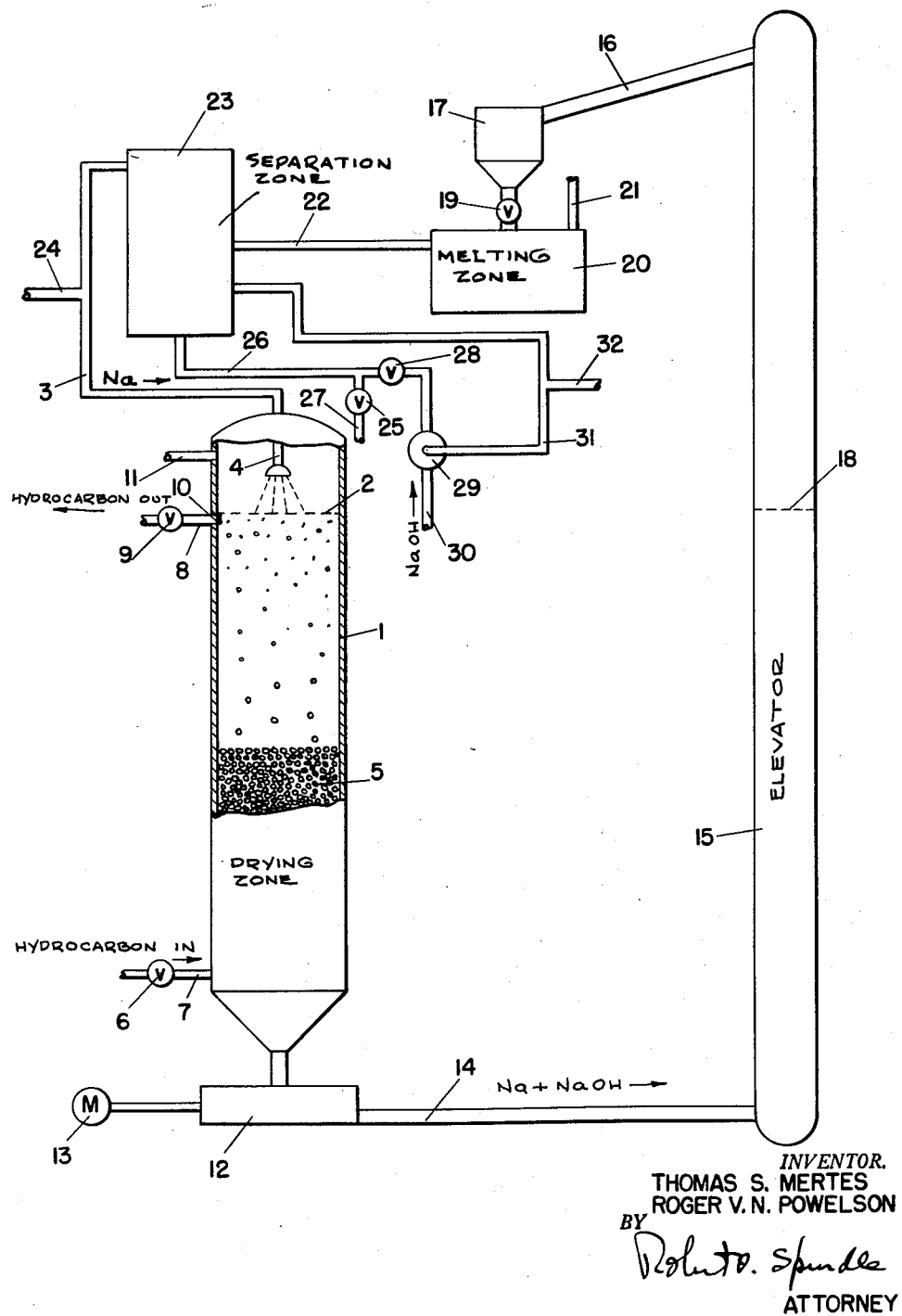

2,927,950

REMOVING TRACES OF MOISTURE FROM HYDROCARBONS WITH SOLID SODIUM PARTICLES

Thomas S. Mertes, Wilmington, Del., and Roger Van Nest Powelson, Ambler, Pa., assignors to Sun Oil Company, Philadelphia, Pa., a corporation of New Jersey Application May 6, 1957, Serial No. 657,380

6 Claims. (Cl. 260—676)

This invention relates to a process for removing moisture from hydrocarbons, and more particularly to a process for removing the last traces of moisture from hydrocarbons which are to be contacted with water-sensitive catalysts or adsorbents.

There are many processes for treating hydrocarbon fractions in which it is desirable to remove water from the feed stock as completely as possible. Examples of such processes are the Ziegler process for polymerizing ethylene to solid polyethylene, in which the aluminum alkyl-titanium chloride catalyst is readily decomposed by even traces of water; the sulfuric acid alkylation process in which water in the feed dilutes the acid catalyst and increases acid consumption per barrel of alkylate produced; processes for the separation of aromatic-saturate mixtures by adsorption, in which water in the feed is far more strongly adsorbed than feed or desorbent components, and causes a gradual decline in efficiency of the adsorbent; and catalytic reforming processes using platinum on alumina catalysts, in which the hydrocracking function of the catalyst is adversely affected by water.

Various commercial methods for removing dissolved water from hydrocarbons, such as percolation through activated alumina or silica gel, have been proposed in the past. These methods, while removing most of the dissolved water, do not completely remove the water. It has been found that hydrocarbons which have been passed through a bed of desiccant will still contain 10 parts per million, or more, of water. While this amount of water is very small, it is undesirable, particularly if the hydrocarbon is to come in contact with the Ziegler catalyst.

It has been found that in the laboratory, small amounts of water can be removed from hydrocarbons by treatment with an alkali metal. This method has not gone into commercial use, however, since once a film of alkali hydroxide has formed on the surface of the metal, it becomes inactive for removal of moisture, and no practical method for removing the film has yet been devised. The film will amount to from about 0.1% to about 0.5% by weight of the sodium, when the particle size of the sodium is from about 20 mesh to about 100 mesh.

It is an object of this invention to provide a process for removing traces of moisture from hydrocarbons which uses an alkali metal as the desiccant.

It is a further object of this invention to provide a process for continuously separating alkali metal from alkali compounds formed by contact of the alkali with the feed hydrocarbons.

According to the present invention, the hydrocarbon to be dried is conducted to a treating tower in which it is contacted with a bed of alkali metal shot, such as sodium shot which has been formed by spraying liquid sodium downwardly into the hydrocarbon as it passes through the tower. Sodium shot covered with a film of sodium hydroxide is continuously removed from the bottom of the tower, is separated from hydrocarbons, and is passed to a melting pot in which it is heated to a temperature above the melting point of sodium metal but below the melting point of sodium hydroxide. The slurry of sodium hydroxide in molten sodium is then passed to a settling vessel in which the sodium hydroxide settles to the bottom while pure molten sodium is continuously removed from the top and is returned to the treating tower, in which it is sprayed, together with make-up sodium, into the hydrocarbon to be treated to replenish the bed of sodium shot in the tower.

In one form of the invention the sodium hydroxide is allowed to remain in the settler until a predetermined quantity has built up, at which time the temperature in the settler is raised above the melting point of sodium hydroxide, which may then be drawn off, free of metallic sodium, from the bottom of the settler. In another form of the invention the settling is conducted in the presence of a substance which is not reactive with sodium hydroxide or molten sodium, which has a specific gravity intermediate between sodium and sodium hydroxide, is immiscible with either sodium or sodium hydroxide, and which is a liquid at the settler temperature. Satisfactory inert liquids include phenanthrene, naphthalene, diphenyl, dibenzyl and retene, or mixtures thereof. If mixtures are used, anthracene may also be present, although this latter substance is not desirable for use alone, since its melting point is rather high, and additional heat is required to maintain the contents of the settler in liquid phase. Phenanthrene is preferred since it has the highest specific gravity and allows for faster settling. In this form of the invention, the sodium hydroxide may be continuously removed from the settler as a slurry in the inert liquid. The slurry is passed to a filter or centrifuge in which the sodium hydroxide is separated from the liquid, which is recycled to the settler along with sufficient additional liquid to make up for that lost to the filter cake.

In order that those skilled in the art may more fully appreciate the nature of the invention and the manner of carrying it out, it will be more particularly described in connection with the accompanying drawing, which is an elevational view, partly in cross-section, of an apparatus suitable for carrying out the invention.

In starting up operation, treating tower 1 is filled with a hydrocarbon liquid, usually the same as the feed which is to be dried, to the level indicated by dotted line 2. Liquid sodium is then introduced to tower 1 through line 3 and spray nozzle 4, which breaks the sodium up into small drops which congeal on contact with the liquid hydrocarbon, and will drop through the liquid to build up a bed 5 of sodium shot in the lower part of tower 1. After bed 5 has been built up to the desired height, valve 6 is opened, and a hydrocarbon feed, containing a small amount of moisture, is continuously passed to tower 1 through line 7. The feed, in passing upwardly through tower 1, contacts the sodium shot, which will react with the water content of the feed to form sodium hydroxide and hydrogen. Hydrocarbons free of water are withdrawn from the upper part of tower 1 through line 8, under the control of valve 9. A screen 10 over the mouth of line 8 is provided to prevent entrainment of sodium shot in the effluent. Hydrogen produced is vented through line 11.

While the feed is being continuously passed upwardly through tower 1, sodium shot covered with a film of sodium hydroxide is continuously picked up by screw conveyor 12, driven by motor 13, and is passed through line 14 to bucket elevator 15. The amount of shot so withdrawn during any period of time is equal to the amount of shot sprayed into tower 1 through nozzle 4, so that the level of the bed of shot 5 is maintained constant. The rate of withdrawal of shot is correlated with the flow rate and water content of the feed in a manner such that the shot in the upper portion of the bed 5 presents a clean sodium surfaces to the feed flowing therethrough, to insure that a sodium reserve is always present in the tower, thus guaranteeing complete removal of water from the feed. That is, assuming a constant feed rate, the greater the water content of the feed, the greater will be the flow of sodium through nozzle 4 and line 14.

Shot picked up by bucket elevator 15 is raised to a point above the level of tower 1 and is dumped through line 16 into hopper 17. Since there is free liquid communication between tower 1 and elevator 15, the liquid level in elevator 15 will be the same as in tower 1, as indicated by dotted line 18, and as the shot passes upward in elevator 15, as it passes the liquid level, hydrocarbons will be drained from the shot. The shot will still be wet with hydrocarbon, however, so that a small amount of hydrocarbons will be carried over to hopper 17.

From hopper 17, the shot is passed continuously under the control of valve 19 into melting tank 20, in which it is heated by any suitable heating means (not shown) to a temperature above the melting point of sodium or to a temperature above the boiling point of the hydrocarbon carried by the shot, whichever may be higher. Vaporized hydrocarbon is withdrawn from melting tank 20 through line 21 for such disposal as may be desired.

From melting tank 20 the melt is taken through line 22 to settling tank 23. When the process is first placed on stream, the melt withdrawn will be substantially pure sodium, since the sodium hydroxide will drop to the bottom of tank 20. After the stream has been on stream for some time, tank 20 will become full of sodium hydroxide as a slurry in molten sodium, so that the melt withdrawn through line 22 will contain sodium and sodium hydroxide in the proportions in which they appear in the shot fed to tank 20.

In tank 23, which is also provided with heating means (not shown) the melt is held at a temperature above the melting point of sodium, and is allowed to stratify into an upper sodium layer, and a lower layer comprising sodium hydroxide. Sodium is continuously withdrawn through line 3 and is passed to nozzle 4, sufficient make-up sodium to replace that lost to sodium hydroxide being added from an extraneous source through line 24.

In one form of the invention, the sodium hydroxide is allowed to accumulate in settling tank 23 until the slurry reaches a predetermined level. At this time, the temperature in tank 23 may be raised to a point above the melting point of sodium hydroxide, which will then form a liquid essentially free of sodium at the bottom of tank 23. Valve 25 may then be opened to draw off the sodium hydroxide through lines 26 and 27. Alternatively, settling tank 23 may be held at a temperature above the melting point of sodium hydroxide at all times, so that it may be withdrawn continuously. This procedure is not preferred, however, because of the additional heat load required to bring the melt to this high temperature and to maintain it there, and because additional cooling facilities would be needed in line 3 to cool the sodium to a point just above its melting point prior to passing it to nozzle 4. Operation in this manner does, however, fall within the scope of the present invention.

In another form of the invention means are provided for the continuous separation of sodium hydroxide at temperatures only slightly above the melting point of sodium. In this embodiment, settling is caused to take place in tank 23 in the presence of an inert substance which is liquid at the temperature maintained in tank 23, which has a specific gravity between that of liquid sodium and solid sodium hydroxide, and which does not dissolve or dissolve in either sodium or sodium hydroxide. Suitable substances are condensed aromatic hydrocarbons such as phenanthrene, naphthalene, retene, diphenyl and dibenzyl. They can be used alone or as mixtures, and may have additionally dissolved in them higher melting substances of higher specific gravity such as anthracene, in order to increase the over-all specific gravity of the liquid. The invention is not limited to the use of these specific substances, however, since any substance which meets the above criteria may be used. When operating according to this form of the invention, a slurry of sodium hydroxide in inert liquid is continuously withdrawn through line 26 and valve 28, and is passed to a separating means 29, which advantageously may be a filter press or a centrifuge. Sodium hydroxide is removed therefrom through line 30, while inert liquid is recycled to settling tank 23 through line 31, additional inert liquid to make up for that lost in the filter cake being introduced to the system through line 32.

It will, of course, be understood by those skilled in the art that prior to placing the process on stream, all pieces of apparatus will be thoroughly purged of oxygen by means of an inert gas, such as hydrogen or nitrogen, and that during operation, an inert atmosphere will be maintained above the liquid in tower 1 and elevator 15, and above the melt in tanks 20 and 23.

It should also be understood that while the foregoing disclosure has been particularly directed to drying hydrocarbons by reaction of water dissolved therein with sodium, the invention should not be so limited, since any other alkali metal, such as potassium or lithium, may be similarly used. From a theoretical standpoint potassium and lithium are to be preferred over sodium, since they are of lower specific gravity, and will separate faster from the inert liquid in tank 23. However, from a commercial standpoint, sodium, due to its low cost and ready availability, is preferred.

While the invention described herein is particularly directed to the removal of trace quantities of water from hydrocarbons, it also has the advantage that if the feed also contains trace quantities of sulfur compounds, a substantial proportion of these compounds will be also removed by reaction with the alkali metal. The sulfides formed by the reaction are higher melting, and are of greater specific gravity than the metal, so that they can be removed from the system together with the hydroxides.

As a specific example of a process for drying hydrocarbons in accordance with the present invention, the following data is given. Tower 1, which is 20 feet high and 4 feet in inside diameter, is filled with isooctane, and liquid sodium, a few degrees above its melting point, is fed into tower 1 through lines 24 and 3, and nozzle 4, which is designed to give a spray of droplets of 20 mesh size, until the tower is about ⅓ full of sodium shot, isooctane displaced during this process being removed through line 10. Valve 6 is then opened, and isooctane, which has previously been dried to a water content of 20 parts per million by contact with alumina, is introduced through line 7 to tower 1 at the rate of 500 barrels per hour. Simultaneously, screw conveyor 12 is set in motion at a rate such as to pass 3000 pounds of sodium per hour to the bucket conveyor, while introduction of sodium to tower 1 through line 24 is regulated to admit a quantity of sodium equivalent to that removed by screw conveyor 12. The sodium removed from tower 1, which is now contaminated by about 0.17% NaOH, formed by reaction of water in the feed with the sodium shot, is passed through melting tank 20 in which it is heated to 110° C. to settler 23, which is of 300 gallon capacity and is half filled with molten phenanthrene. In settler 23 sodium hydroxide will settle to the bottom, and is removed as a slurry in phenanthrene. The sodium hydroxide is separated from the phenanthrene in centrifuge 29, and the separated phenanthrene is returned to settler 23 through line 31, sodium hydroxide in the amount of 5.2 pounds per hour being taken through line 30 for disposal. When settler 23 has been filled, purified sodium is continuously removed therefrom and returned to tower 1, while flow of sodium through line 24 is reduced to that amount required to replace sodium converted to sodium hydroxide. Preferably the flow through line 24 is intermittent, in batches of 50 to 100 pounds of sodium, since it is difficult to continuously meter the small amount of sodium required (3 pounds per hour) and small variations in the height of the bed of sodium shot will not adversely affect the efficiency of the process. It will be found that the effluent from tank 1 taken off through line 10 is free from detectable traces of water, and is fit for use as a solvent in a polymerization process using a titanium trichloride-aluminum alkyl catalyst.

The invention claimed is:

1. A process for removing trace quantities of moisture from hydrocarbons which comprises maintaining a bed of alkali metal in solid particulate form in the lower portion of a treating tower, continuously passing in liquid phase a hydrocarbon feed containing trace amounts of water upwardly through said bed, continuously removing alkali metal contaminated with alkali metal hydroxide from the lower portion of the bed, continuously adding alkali metal particles to the upper portion of the bed in an amount equal to that withdrawn from the lower portion of the bed, the rate of withdrawal of the alkali metal being correlated to the water content of the feed in a manner such as to maintain a clean surface on the alkali metal particles in the upper portion of the bed, passing the alkali metal particles removed from the treating tower to a melting tank, heating them therein to a temperature in excess of the melting point of the alkali metal but below the melting point of the alkali metal hydroxide in the presence of an inert liquid having a specific gravity intermediate between that of the alkali metal and the alkali metal hydroxide, gravitationally separating solid alkali metal hydroxide from molten alkali metal, recovering purified alkali metal, and returning the so-recovered alkali metal in liquid phase to the treating tower through a spray nozzle located in the upper part thereof.

2. The process according to claim 1 in which the inert liquid is phenanthrene.

3. The process according to claim 1 in which the inert liquid is naphthalene.

4. The process according to claim 1 in which the inert liquid is diphenyl.

5. The process according to claim 1 in which the inert liquid is dibenzyl.

6. The process according to claim 1 in which the inert liquid is retene.

References Cited in the file of this patent

UNITED STATES PATENTS

| | | |
|---|---|---|
| 1,466,435 | Hammond | Aug. 28, 1923 |
| 1,801,412 | Carlisle | Apr. 21, 1931 |
| 1,862,003 | Carlisle et al. | June 7, 1932 |
| 1,890,881 | Magill | Dec. 13, 1932 |
| 2,073,631 | Gilbert | Mar. 16, 1937 |
| 2,169,545 | Vose | Aug. 15, 1939 |
| 2,759,896 | Hawkes et al. | Aug. 21, 1956 |